United States Patent [19]
Cutler et al.

[11] 4,247,890
[45] Jan. 27, 1981

[54] REVERSIBLE INVERTER SYSTEM HAVING IMPROVED CONTROL SCHEME

[75] Inventors: John H. Cutler, Roanoke; Loren H. Walker, Salem, both of Va.

[73] Assignee: General Electric Company, Salem, Va.

[21] Appl. No.: 32,853

[22] Filed: Apr. 24, 1979

[51] Int. Cl.³ .................. H02M 7/515; H02M 7/757
[52] U.S. Cl. .................................. 363/137; 307/228; 328/74; 318/722; 318/345 G
[58] Field of Search ............... 318/739, 756, 801–803, 318/807, 810–812, 722, 344, 345 G; 328/72, 74; 363/137, 135, 136, 96, 138; 307/228, 356

[56] References Cited

U.S. PATENT DOCUMENTS

| | | | |
|---|---|---|---|
| 3,278,737 | 10/1966 | Germain | 307/228 X |
| 3,353,081 | 11/1967 | Stemmler | 318/807 X |
| 3,493,961 | 2/1970 | Hansen | 307/228 X |
| 3,808,460 | 4/1974 | Mosca | 307/228 |
| 3,831,113 | 8/1974 | Ahmed | 307/228 X |
| 4,032,831 | 6/1977 | Nabae et al. | 363/41 X |

*Primary Examiner*—William M. Shoop
*Attorney, Agent, or Firm*—Arnold E. Renner

[57] ABSTRACT

An inverter system for supplying variable frequency alternating current power to a load such as an a.c. motor includes an inverter bridge of controlled rectifiers which are selectively rendered conductive by the application thereto of gating pulses. The gating signals result from a control circuit which includes a voltage controlled oscillator responsive to a command signal having a d.c. magnitude and polarity which in turn outputs a signal having a substantially saw-tooth wave shape. Comparator circuits responsive to the saw-tooth wave shape signal provide timing pulses and direction signals which are applied to a shift register to effect movement of the register contents the extant status of which initiates the production of the gating signals for rendering the semiconductors conductive.

12 Claims, 3 Drawing Figures

REVERSIBLE INVERTER SYSTEM HAVING IMPROVED CONTROL SCHEME

BACKGROUND OF THE INVENTION

The present invention relates generally to inverter power conversion systems such as those used to supply variable frequency alternating current power to an electric motor and more particularly to such systems having improved control means.

It has been known for many years to provide variable power and frequency alternating current (a.c.) to a load through the use of a bridge arrangement of controlled rectifiers. Originally, the rectifiers employed in such bridges were usually gas tube devices such as thyratrons but it is now much more common to use semiconductor devices of the gate control type which are generically known as thyristors, the most common form of which is the silicon controlled rectifier. For convenience and purposes of this description, the term thyristor will be used as a generic term.

In one of the more common three phase versions of the inverter bridge, variable direct current (d.c.) power is applied to a six thyristor bridge having a pair of series thyristors associated with each leg of the three phase output. An inverter control supplies gate pulses to gate the thyristors on at the desired frequency for the inverter output. One very common form of control which is known in the art includes an oscillator which outputs pulses at a frequency six times that desired for the output of the inverter (one pulse per thyristor per cycle). The actual gating pulses used to render the thyristors conductive are derived from a recirculating shift register having six bit positions. The contents of the register are shifted one bit position with each application of a timing pulse and in a direction determined by a direction signal signifying whether the inverter is to run in the forward or reverse mode.

In allowed United States Patent Application Ser. No. 895,136, filed Aug. 10, 1978, "Reversible Variable Frequency Oscillator For Smooth Reversing of AC Motor Drives" by P. M. Espelage et al, which application is assigned to the assignee of the present invention and which application is specifically incorporated hereinto by reference, there is described a control for a controlled current inverter drive which is designed to operate on a command signal having a relatively small d.c. component representing the desired frequency and a relatively large ripple component. The system described in that application employs an integrator for receiving an input command signal as described above and which further has a polarity designating the desired mode of operation. The output of the integrator is essentially a ramp function which is applied to two comparator circuits which sense, respectively, positive and negative going ramp signals. When the ramp signal reaches a predetermined magnitude as determined by the comparator circuit, there is provided as an output signal a timing pulse which first serves to reset the integrator and which also serves, depending upon whether the timing pulse is from the positive or negative side of the system, to set a direction flip-flop the output of which provides the direction signal to a recirculating shift register. After a short delay to allow the direction flip-flop to set and apply direction signal to the recirculating shift register, the timing pulse is applied to the shift register to cause the contents thereof to shift. The extant content of the shift register is used to initiate the gating signals for the thyristors.

While the above described system works very well with components which are built to very close tolerances and for low frequency operations, there are several factors which make the system less than totally satisfactory for high frequency commercial applications. These factors consist, essentially, of the use of the directional flip-flop in conjunction with the delay network used to delay the application of the timing signals to the shift register so as to allow sufficient time for the direction signal to be applied. This delay, particularly at high frequencies, has a tendency to appear as a change of frequency which results in linearity errors which are not always acceptable. In addition, because the allowable times were short, the high frequency flip-flops required are basically noise sensitive by nature. Hence, to reduce noise sensitivity, it is necessary to include a considerable amount of filtering which, in turn, reduces the operational speed of the flip-flop and hence increases the non-linearity errors.

SUMMARY OF THE INVENTION

It is, therefore, an object of the present invention to provide an improved power inverter power conversion system.

It is another object to provide an improved control for a reversing inverter system which employs the content of a shift register for control of the system output.

It is a further object to provide an improved control means for a reversing inverter system of the type in which the contents of the shift register are used to control the system output and in which the register contents are shifted within the register at a rate and in a direction in accordance with signals derived from a generally saw-tooth wave shape signal having a frequency proportional to the desired operating frequency of the system and a relative polarity designating desired direction of operation.

The foregoing and other objects are achieved in accordance with the present invention by providing an inverter system for converting d.c. power to a.c. power of variable frequency through the use of a power conversion bridge having a plurality of controlled rectifiers. The controlled rectifiers are rendered conductive in response to gating signals, applied to the gates thereof, which are the function of the instantaneous or extant content of a shift register. The contents of the register are shifted at a rate determined by applied timing pulses and in a direction designated by a direction signal. The timing pulses and direction signals are derived as a function of a substantially saw-tooth wave shape signal having a frequency proportional to the desired operating frequency of the inverter system. This wave shape signal is applied to two comparators for positive operation and two comparators for negative operation. Looking at the positive operation, the reference levels utilized for the comparator generating the timing signal is higher than that utilized for generating the direction signal. Thus, derived from the same saw-tooth wave shape signal applied to the comparator are two signals differentiated in time as determined by the variance between the values of two reference levels. The negative side is operated in the same manner. The direction signals thus derived are applied to the shift register to specify the direction of shifting and the timing pulses are used to effect the actual shifting within the register.

BRIEF DESCRIPTION OF THE DRAWING

While the present invention is particularly defined in the claims annexed to and forming a part of this specification, a better understanding can be had from the following description taken in conjunction with the accompanying drawing in which:

DETAILED DESCRIPTION

Figure 1:
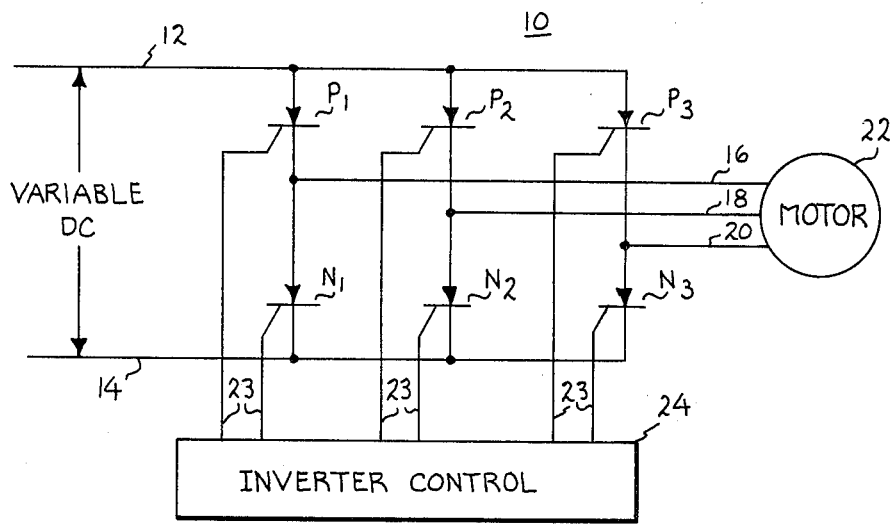
FIG. 1 is a schematic diagram of a basic inverter circuit as known in the prior art and as is preferably employed in the present invention.

Referencing now FIG. 1, there is shown in basic schematic form, an inverter system such as is known in the prior art and such as is generally applicable to the present invention. In FIG. 1, only the basic conducting elements have been shown in relationship to the total system and refinements such as snubbing circuits, commutating circuits, etc. have been omitted since these do not play any part in the understanding of the present invention. As shown in FIG. 1, the inverter system includes a three phase semiconductor bridge 10 comprised of three positive thyristors $P_1$, $P_2$ and $P_3$ and three negative thyristors $N_1$, $N_2$ and $N_3$. The bridge is connected to a source of variable d.c. power by way of a pair of buses 12 and 14. The source can supply variable d.c. voltage and/or current in accordance with the nature of the actual operational status of the bridge 10. As well as being grouped as positive and negative thyristors, grouping may be made according to phase. Line 16 is connected at the junction of the series connected thyristors $P_1$ and $N_1$ as a first phase input to a load 22 which may be, as is often the case, an a.c. motor. Thyristors $P_2$ and $N_2$ are connected by way of phase line 18 to the load and in a similar manner the third leg of the bridge, comprising series connected thyristors $P_3$ and $N_3$, is connected by way of phase line 20 to the load. In the illustrated embodiment, the thyristors are rendered conductive by the appropriate application thereto of gating signals on leads 23 connected to the gate electrodes of each of the thyristors. The actual gating signals are developed by an inverter control 24 the nature of which will be determined in accordance with the type and overall desired function of the inverter and which in the present invention will be described in detail with respect to FIG. 2 and 3.

Figure 2:
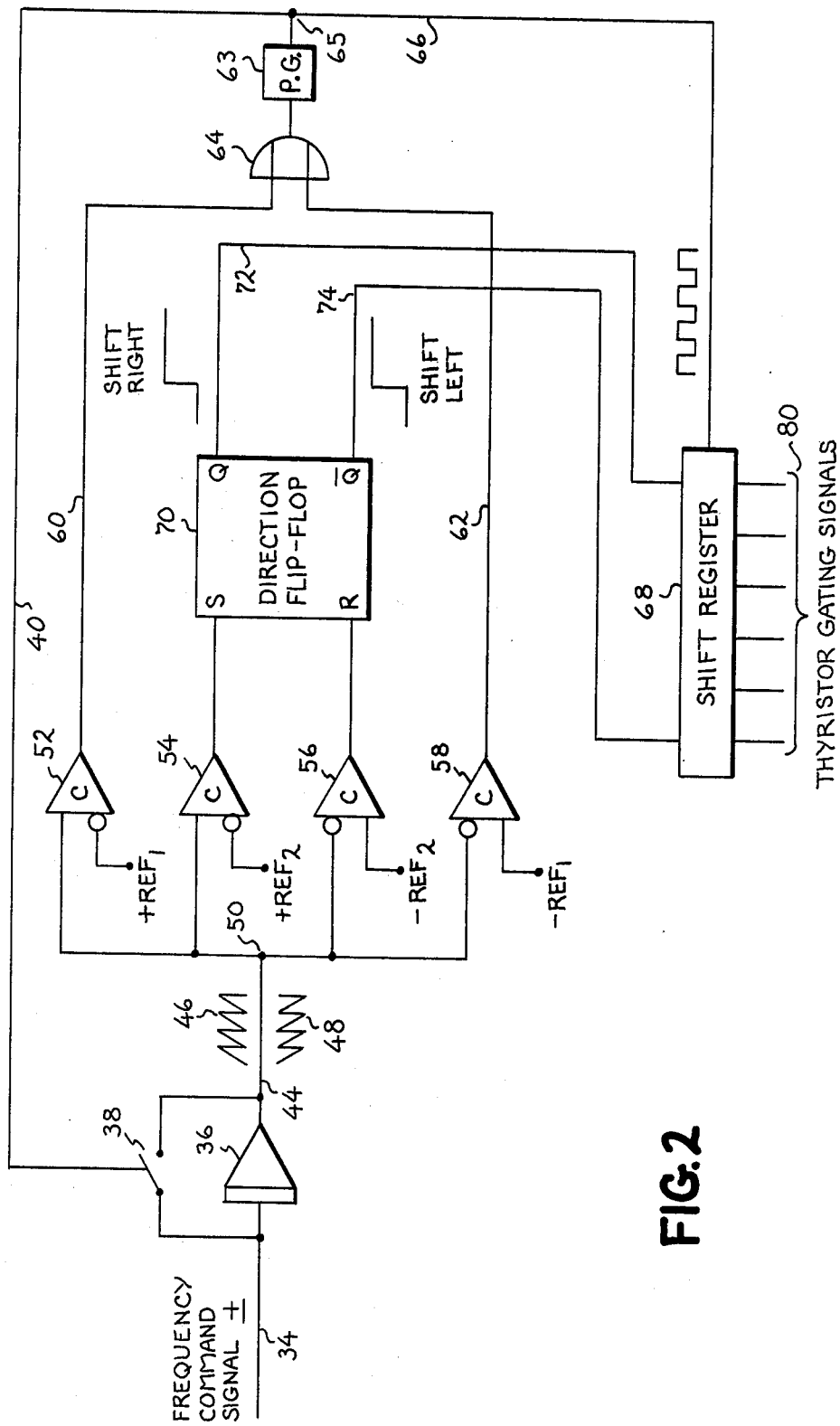
FIG. 2 is a schematic diagram of the firing control for use with the inverter system and in accordance with the preferred embodiment of the present invention; and, FIG. 3 shows wave shapes helpful in the understanding of the present invention.

Reference is now made to FIG. 2 which shows the present invention in its preferred embodiment. A frequency command signal, which may be either positive or negative, is applied from some suitable source not shown by way of line 34 to an integrator 36 having a resetting switch 38 connected in parallel therewith. Typically, integrator 36 would be comprised of an operational amplifier with a feedback capacitor connected between its output terminal and its input terminal and resetting switch 38 would be solid state switch such as a transistor which is gated on by means of a signal applied by way of a line 40 for purposes to be subsequently described. For purposes of illustration, switch 38 has been illustrated only in its functional form. In response to the input on line 34, there appears at the output of integrator 36, on line 44, a one of the wave shapes shown at 46 and 48. Assuming a positive signal on line 34, the positive wave shape 46 will result and if a negative signal is applied, a negative wave shape as is shown at 48 will be present. Thus, in accordance with known operation of integrating circuits, the output of integrator 36 is essentially a ramp function which terminates when switch 38 is closed to effect a resetting of the integrator. With a closing of switch 38 there will be a rapid decrease in the integrator output such that a generally saw-tooth configuration appears at the integrator output on line 44 and at junction 50. The command signal input on line 34 is essentially a d.c. signal although it may include a considerable amount of a.c. ripple as is described in the aforementioned application Ser. No. 895,136.

The amplitude of the wave shapes 46 and 48 is a fixed value and, as will be more fully understood as this description proceeds, is determined by the value of the reference signal utilized to generate the timing pulses. The frequency of their occurrence is dependent upon the magnitude of the d.c. component of the command signal on line 34 inasmuch as the magnitude of this signal determines the rate at which the integrator ramps to the fixed value.

The saw-tooth signal appearing on line 44, as seen at junction 50, serves as an input to four comparators 52, 54, 56 and 58. Comparators 52 and 58 serve to generate a train of pulses, the timing pulses, which occur at a frequency, as earlier stated, dependent upon the value of the d.c. component of the command signal on line 34. To achieve this function, comparator 52 has its noninverting input connected to the junction 50 while its inverting input is connected to a source of positive potential ($+REF_1$) having a value which is predetermined in accordance with the desired operation of the system. In a similar manner, comparator 58 has its inverting input connected to junction 50 and its noninverting input connected to a negative reference potential ($-REF_1$) which reference is of the same absolute magnitude as the reference $+REF_1$ but of opposite sign. Thus, depending upon the direction of integration, whenever the output of the integrator 36 reaches the value of the respective reference signal, there will appear at the output of the respective comparator 52 or 58 an output signal. The output of comparator 52, on line 60, and the output of comparator 58, on line 62, are both applied to an OR gate 64 the output of which is applied to a suitable pulse generator 63 (for example, a monostable multivibrator or one-shot). The output of the pulse generator 63, at junction 65, is a series of pulses independent of whether the integrator 36 is integrating in the positive or negative direction. The pulses appearing at junction 65 are applied by way of line 40 to the switch 38 to reset the integrator and thus effect the saw-tooth wave shape signal as previously described. The train of timing pulses at junction 65 is also applied, by way of line 66, as one input to a shift register 68 for reasons to be further discussed hereinafter.

The second pair of comparators, 54 and 56, are direction comparators and also have applied thereto the signal which appears at junction 50. In the case of comparator 54, the signal is applied by way of a non-inverting input while comparator 56 has the signal from junction 50 applied by way of its inverting input. The inverting input of comparator 54 is connected to a second positive potential ($+REF_2$) while the noninverting input of comparator 56 is connected to a second negative reference potential ($-REF_2$). By making the absolute magnitudes of the $+REF_2$ and $-REF_2$ potentials somewhat less than those of $+REF_1$ and $-REF_1$, each of the comparators 54 and 56 will provide an output, respectively for positive and negative command signals on line 34, at a time sooner than those provided by comparators 52 and 58. The amount of the time interval is dependent upon the differential between the respective reference values. This will be further explained with respect to FIG. 3.

The signals from the two comparators 54 and 56 are applied to a direction flip-flop 70 with the set terminal of flip-flop 70 receiving an input from comparator 54 and the reset terminal receiving an input from comparator 56. Direction flip-flop 70 serves as a latch to provide a pair of steering or direction signals at its outputs which are designated as "shift right" (Q output, line 72) and "shift left" ($\bar{Q}$ output, line 74). The shift right and shift left signals are also applied to the shift register 68.

Shift register 68 may be of any suitable configuration. One such configuration is a recirculating shift register having six bit positions and a parallel load such that a particular bit configuration placed into the register will recirculate therethrough at a rate determined by the timing pulses appearing on line 66 and in a direction in accordance with the presence of a direction signal on line 72 or 74. The instantaneous or extant condition of the bit position contents of the register (e.g. either a binary 1 or a binary 0) are sensed to produce thyristor gating signals on lines 80. This is in accordance with prior art practice as is the fact that the signals emanating from the register 68; that is, the signals on line 80, would not normally be used to gate the thyristors of the bridge directly but would instead serve to operate suitable gate drivers. An alternative to the recirculating shift register is the open ended shift register with automatic correction capabilities as is described and claimed in, allowed co-pending application Ser. No. 032,895 (Assignee's Docket No. 21-DSH-2517), "Inverter Power Conversion System Having Improved Control Scheme" by the inventors of the present invention which application was filed on even date herewith, is assigned to the assignee of this invention and which application is specifically incorporated hereinto by reference. As described in detail in that application, this system involves an open ended shift register the contents of which are shifted in accordance with the occurrence of pulses on line 66 and in the direction defined by the direction signals as is the case with the recirculating shift register. This system, however, provides for an open end register with an automatic reloading feature such that any errors which appear in the register contents are not perpetuated but are, in fact, dropped and replaced by a proper pattern. Very briefly, this is achieved by sensing certain bit position contents and responding to that sensing at the occurrence of a timing pulse to place a binary 1 in an end position of the open ended shift register which binary 1 is shifted therethrough to generate gating signals for pairs of thyristors.

Figure 3:
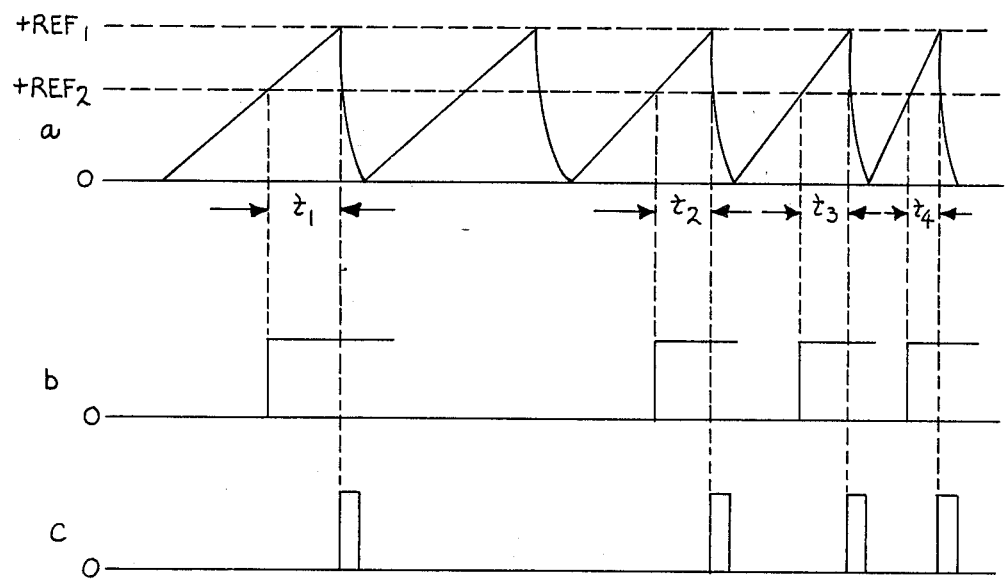

The operation of the FIG. 2 circuitry is graphically illustrated in FIG. 3. FIG. 3, graph a, shows the output of integrator 36. In that illustration, saw-tooth wave shapes appearing at the far right occur at approximately twice the frequency as those on the far left. Looking at FIG. 3 in conjunction with FIG. 2, with the presence of a positive command signal on line 34, the integrator 36 will begin to ramp up positively at a rate depending upon the d.c. component of the command signal. When the ramp voltage reaches a point designated $+REF_1$, comparator 52 will output a signal on line 60 which, by way of OR gate 64, pulse generator 63 and line 40 is applied to the switch 38 to reset the integrator to its initial or starting value and permit the integration to begin once more. The signal at junction 65 is also, from FIG. 2, the timing pulses which are illustrated by graph c of FIG. 3. As is illustrated by progressing to the right on graph a of FIG. 3, as the command signal on line 34 increases in magnitude, the rate of integration will increase and hence the frequency of the system will increase.

Also shown in graph a is the second reference signal $+REF_2$. It is seen that this signal is of somewhat smaller magnitude than the reference $+REF_1$. As such, the output of comparator 54 will occur at an earlier time. Graph b of FIG. 3 illustrates the occurrence of the output of comparator 54 and also the setting of the latch flip-flop 70. The shift right signal appears assuming a change in the status of the flip-flop 70 at an earlier time than do the timing signals (graph c). Time intervals "$t_n$" shown between the origination of the shift right direction signal and the timing pulses is the time allotted for the direction flip-flop 70 to set and to settle to provide the steering or direction signal to the shift register 68. It is seen that as progression is made from left to right in FIG. 3, that the successive time intervals $t_1$, $t_2$, $t_3$ and $t_4$ between the generation of the direction signal and the generation of the timing pulse decreases with an increase in frequency. However, even at the higher frequency indicated by the far right-hand saw-tooth wave shape, time interval $t_4$ is still a significant percentage of the total interval between timing pulses to allow even slow and hence essentially noise immune flip-flop circuitry to settle and provide any change of direction signal to be applied to the shift register prior to the occurrence of the next timing pulse. Of course, if there is no change in the direction signal between successive timing pulses, the problem of time does not exist since the latching flip-flop 70 does not change state. Operation of the system in the negative direction would be the same as that just described excepting that integration would be in the negative direction and comparators 56 and 58 would be operative.

Thus, it is seen that there has been provided an inverter system which provides for accurate timing and shifting without requiring undue circuitry and which readily insures a sufficient time for the generation of direction signals to permit component settlement so that erroneous operation does not occur.

While there has been shown and described what is at present considered to be the preferred embodiment of the present invention, modifications thereto will readily occur to those skilled in the art. For example, in the embodiment illustrated, the comparators which generate the timing pulses also serve as that part of the system which is basically a voltage controlled oscillator. The principles of the present invention are equally applicable to a system in which the oscillator is separate and distinct from the means to generate the timing pulses. It is entirely feasible to practice the present invention by providing a voltage controlled oscillator which outputs a saw-tooth wave shape independently of the timing pulse comparators and to match the comparator trip level to the maximum output amplitude of the oscillator to thereby achieve identical results as those provided by the illustrated preferred embodiment. In this type of system, the reference level of the comparators for generating the direction signal(s) would again be at a lower level as before. It is not desired, therefore, that the invention be limited to the specific arrangements shown and described and it is intended to cover in the appended claims all such modifications as fall within the true spirit and scope of the invention.

What is claimed is:

1. A reversible inverter system for converting direct current power to alternating current power of variable frequency in response to a generally direct current input command signal having a magnitude proportional to the desired output frequency of the system and a relative polarity indicative of the direction of system operation, said system comprising:
   (a) a power conversion bridge having a plurality of controlled rectifiers for converting said direct current power to variable frequency alternating power in response to gating signals applied thereto;
   (b) means for generating timing pulses and direction signals in response to said input command signal comprising,
      (1) means to generate a generally saw-tooth wave shape signal of substantially constant peak amplitude having a frequency proportional to the magnitude of said input command signal and a relative polarity dependent upon the relative polarity of said command signal,
      (2) first comparator means responsive to said saw-tooth wave shape to produce said timing pulses at approximately the time of peak amplitude of said wave shape signal, and
      (3) second comparator means responsive to said saw-tooth wave shape signal to effect the production of said direction signals in response to a wave shape signal amplitude less than said peak and at a time earlier than said peak amplitude is reached; and,
   (c) means responsive to said timing pulses and said direction signals for generating the gating signals for controlling the operation of the controlled rectifiers of the bridge.

2. The invention in accordance with claim 1 wherein said first and second comparator means each comprises first and second comparator amplifiers responsive, respectively, to positive and negative going saw-tooth wave shape signals.

3. The invention in accordance with claim 1 wherein said means for generating said timing pulses and said direction signals includes an integrating circuit for generating a ramp function signal which is reset to an initial level in response to the occurrence of a one of said timing signals.

4. The invention in accordance with claim 1 wherein said last recited means includes a shift register the extant contents of which effect the initiation of said gating signals, said contents being shifted, in said register, in response to said timing pulses and in a direction specified by said direction signals.

5. A reversible inverter system for converting direct current power to alternating current power of variable frequency in response to a generally direct current input command signal having a magnitude proportional to the desired output frequency of the system and a relative polarity indicative of the direction of the system, said system comprising:
   (a) a power conversion bridge having a plurality of controlled rectifiers for converting said direct current power to variable frequency alternating current power in response to gating signals applied thereto;
   (b) means for generating timing pulses and direction signals in response to said input command signals comprising,
      (1) ramp means to generate a ramp function wave shape signal which increases from an initial value at a rate dependent upon the magnitude of said command signal and in a direction dependent upon the relative polarity of said command signal,
      (2) means to produce said timing pulses including first and second comparator circuits responsive, respectively, to relatively positive and negative ramp function wave shape signals, said comparator circuits producing said pulses at a first prescribed absolute magnitude of said wave shape,
      (3) means to apply said pulses to said ramp means whereby said ramp means is reset to said initial value,
      (4) means to produce said direction signal including first and second additional comparator circuits responsive, respectively, to relative positive and negative ramp function wave shape signals, said additional comparator circuits producing signals serving to initiate said direction signals at a second prescribed absolute magnitude of said wave shape signal, said second absolute magnitude being less than said first absolute magnitude; and,
   (c) means responsive to said timing signals and said direction signals for generating the gating signals for controlling the operation of the controlled rectifiers of the bridge.

6. The invention in accordance with claim 5 wherein the last recited means includes a shift register, the extant contents of which effect the initiation of said gating signals, said contents being shifted, in said register, in response to said timing pulses and in a direction specified by said direction signals.

7. The invention in accordance with claim 5 wherein said means to produce said direction signals further includes latch means responsive to the signals produced by said additional comparator circuits, said latch means providing said direction signals as an output thereof.

8. In a reversible a.c. motor drive including an inverter system including a bridge of controlled rectifiers for supplying adjustable frequency alternating current power to the motor and which further includes control means responsive to a command signal to initiate pulses for rendering the controlled rectifiers of said bridge conductive, the improvement in said control means comprising:
   (a) means for generating timing pulses and direction signals in response to said input command signal comprising,
      (1) means to generate a generally saw-tooth wave shape signal of substantially constant maximum amplitude having a frequency proportional to the magnitude of said input command signal and a relative polarity dependent upon the relative polarity of said command signal,
      (2) first comparator means responsive to said saw-tooth wave shape signal to produce said timing pulses at approximately the time of peak amplitude of said wave shape, and
      (3) second comparator means responsive to said saw-tooth wave shape to effect the production of said direction signals in response to a wave shape signal amplitude less than said peak and at a time earlier than said peak amplitude is reached; and, (b) means responsive to said timing pulses and said direction signals for generating the gating signals for controlling the operation of the controlled rectifiers of the bridge.

9. The invention in accordance with claim 8 wherein said first and second comparator means each comprises first and second comparator amplifiers responsive respectively to positive and negative going saw-tooth wave shape signals.

10. The invention in accordance with claim 8 wherein said means for generating timing pulses and direction signals includes an integrating circuit for generating a ramp function wave shape which is reset to an initial level in response to the occurrence of a one of said timing signals.

11. The invention in accordance with claim 8 wherein said last recited means includes a shift register the extant contents of which effect the initiation of said gating signals, said contents being shifted, in said register, in response to said timing pulses and in a direction specified by said direction signals.

12. In a reversible alternating current motor drive including an inverter system including a bridge of controlled rectifiers for supplying adjustable frequency alternating current power to the motor and which further includes control means responsive to a command signal to initiate gating pulses for rendering the controlled rectifiers of said bridge conductive, the improvement in said control means comprising:

(a) means for generating timing pulses and direction signals in response to said input command signals comprising,
  (1) ramp means to generate a ramp function wave shape signal which increases from an initial value at a rate dependent upon the magnitude of said command signal and in a direction dependent upon the relative polarity of said command signal,
  (2) means to produce said timing pulses including first and second comparator responsive, respectively, to relative positive and negative ramp function wave shape signals, said comparator circuits producing said pulses at a first prescribed absolute magnitude of said wave shape,
  (3) means to apply said pulses to said ramp means whereby said ramp means is reset to said initial value,
  (4) means to produce said direction signals including first and second additional comparator circuits responsive respectively to relative positive and negative ramp function wave shape signals, said additional comparator circuits producing signals serving to initiate said direction signals at a second prescribed absolute magnitude of said wave shape signals, said second absolute magnitude being less than said first absolute magnitude; and,
(b) means responsive to said timing signals and said direction signals for generating the gating signals for controlling the operation of the controlled rectifiers of the bridge.

* * * * *